Sept. 26, 1933. R. R. GOBEREAU ET AL Re. 18,957

PROPELLER

Original Filed June 29, 1928 6 Sheets-Sheet 1

Inventors,
Robert Richard Gobereau and
Lucien Edouard Maujole, deceased,
by Robert Richard Gobereau, assignee,
BY
Mauro & Lewis
Attorneys, Sept. 26, 1933. R. R. GOBEREAU ET AL Re. 18,957

PROPELLER

Original Filed June 29, 1928 6 Sheets-Sheet 2

Inventors
Robert Richard Gobereau 2nd
Lucien Edouard Maujole, deceased,
by Robert Richard Gobereau, assignee,
BY
Mauro & Lewis,
Attorneys

PROPELLER

Original Filed June 29, 1928 6 Sheets-Sheet 3

Inventors,
Robert Richard Gobereau and
Lucien Edouard Maujole, deceased,
by Robert Richard Gobereau, assignee,
BY
Mauro & Lewis,
Attorneys INVENTORS,
Robert Richard Gobereau and
Lucien Edouard Maujole, deceased,
by Robert Richard Gobereau, assignee,
BY
Mauro & Lewis,
ATTORNEYS.

PROPELLER

Original Filed June 29, 1928 6 Sheets-Sheet 5

INVENTORS,
Robert Richard Gobereau and
Lucien Edouard Maujole, deceased,
by Robert Richard Gobereau, assignee,
BY Mauro & Lewis,
ATTORNEYS.

PROPELLER

Original Filed June 29, 1928 6 Sheets-Sheet 6

INVENTORS,
Robert Richard Gobereau and
Lucien Edouard Maujole, deceased,
by Robert Richard Gobereau, assignee,
BY
Marrot Lewis, ATTORNEYS.

Patented Sept. 26, 1933 Re. 18,957

UNITED STATES PATENT OFFICE 18,957

PROPELLER

Robert Richard Gobereau, Paris, and Lucien Edouard Maujole, deceased, late of Paris, France, Alphonse Jules Chardin, administrator of the estate of said Lucien Edouard Maujole, deceased, assignor to said Robert Richard Gobereau Original No. 1,829,443, dated October 27, 1931, Serial No. 289,255, June 29, 1928, and in France July 2, 1927. Application for reissue November 9, 1932. Serial No. 641,944

10 Claims. (Cl. 170—162)

The present invention has for its object a propeller for aeroplanes the pitch of which varies automatically so that the inclination of its blades is the best for all speeds of the aeroplane and of the engine.

In the case of a propeller with invariable pitch, the power of the motor is not utilized to the best advantage. When the aeroplane is below its normal linear speed the inclination of the blades should be less than when it attains the maximum speed whereof the engine is capable under normal working conditions. When the aeroplane starts, the propeller should have a pitch such that, acting upon the air which is stationary with respect to the aeroplane, it exerts the highest possible traction effect. In proportion as the speed of the aeroplane increases and as in consequence the aeroplane acts upon air which has a constantly accelerating speed relatively to the aeroplane, it is necessary in order to utilize the engine most efficiently that the pitch of the propeller should increase progressively.

It has been sought heretofore to solve this problem by means of different systems utilizing the effect of antagonistic springs or of centrifugal masses which act directly upon the blades of the propeller so as to cause their pitch to alter as a function of the resistance of the air on the blades or of the speed of rotation; but, as is known, such devices afford at best but an imperfect solution of the problem.

The present invention furnishes a solution which leaves nothing to be desired and which, while assuring an automatic variation of the inclination of the blades with respect to the axis of the engine under the best conditions, also affords constantly a high flexibility in the entrainment of the propeller.

The device which forms the object of the invention is characterized essentially by the fact that the blades of the propeller are mounted in an orientatable manner on a support which is entrained—not directly by the shaft of the engine, but—through the intermediary of one or more movable members controlled by the opposing action of centrifugal masses mounted on the support of the blades, the angular variations of the shaft of the engine with respect to the reactions of the centrifugal masses, or more simply with respect to the support, being utilized to cause, by suitable connections, the angle of inclination of the blades to vary, the centrifugal masses and the different connections between the movable members of the device being dimensioned and arranged so that the variable resistant couple of the propeller is brought at each instant to a value equal to and contrary in sign to the engine couple.

Thus, for a given engine having a given power under a certain speed of rotation, the centrifugal system generates an antagonistic force opposite and equal to the engine couple, and to the resistance of the air on the blades, so that the inclination of the blades is always the best for all speeds of rotation of the engine for all the engine couples developed by it and for all speeds of the aeroplane.

The invention is also characterized by the combination with a propeller, preferably one having a variable pitch as defined above, of shock absorbers intended to deaden the oscillations of the system.

The invention is further characterized by the combination with a propeller having a variable pitch as defined above of a flexible connection between the engine shaft and the propeller to permit the latter to orientate itself suitably with respect to the said shaft so as to effect a differential compensation, equilibrating the thrusts of each blade.

Finally, the invention is characterized by the combination with a propeller, preferably one having a variable pitch as defined above, of a system of high resistance stop or abutment comprising balls or sets of rollers in which the different elements are constituted in such a manner that, when the bearing elements (balls, cylindrical or tapered rollers) and the bearing races are subjected to a high thrust, a second element suitably arranged comes into action before the metal which constitutes the races or the bearing members has reached its elastic limit. Said auxiliary element thus acts to maintain practically constant the interval between the two races and consequently to prevent the thrust on the rolling elements from increasing. Said element also intervenes in order to increase the bearing surfaces.

The second element may, for example, be constituted by the cage which is usually interposed between the bearing elements in order to space them suitably, or in the special case where rollers are used, it may be constituted by a second roller arranged inside the bearing element which will have been hollowed out for this purpose.

The play between the auxiliary element which reinforces the resistance of the stop and the normal bearing element will be small and will depend on the elastic limit of the metals employed.

While the bearing element will be relieved of the pressure upon it by the intervention of the auxiliary element, the races will not have their work increased, because of the increase of the surfaces of contact resulting either from the direct bearing of the auxiliary element against the races or from the deformation of the bearing element itself before this deformation is limited by the intervention of the auxiliary element.

In the accompanying drawings and by way of example,

Figure 1:
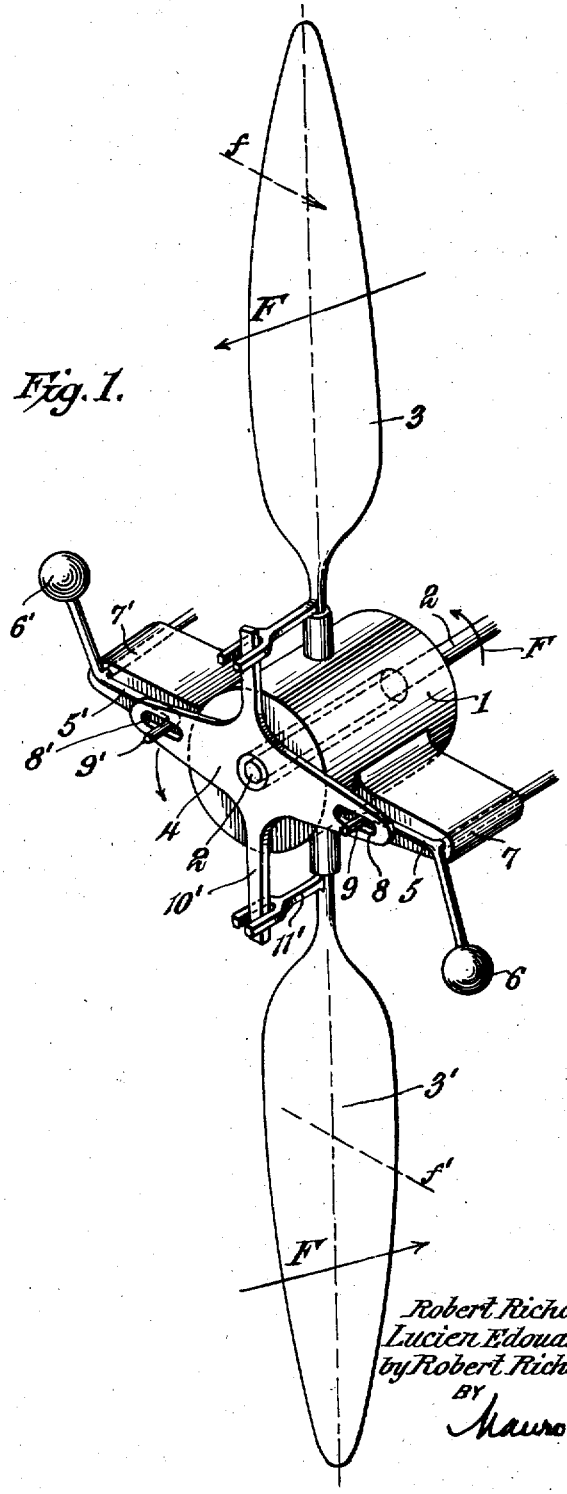
Fig. 1 is a diagrammatic view in perspective illustrating the invention.
Figure 2:
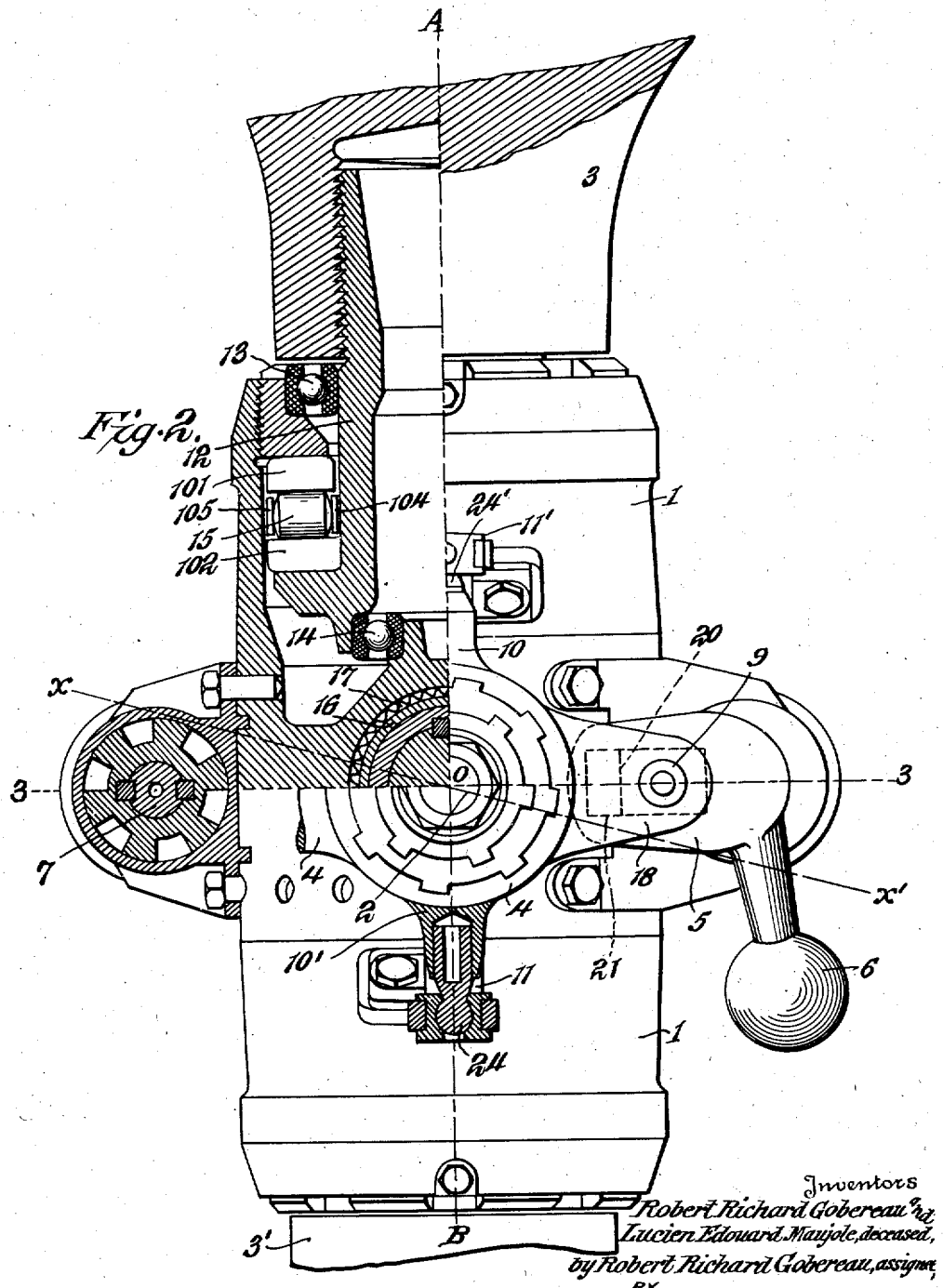
Fig. 2 is an elevation partly in section of a propeller with variable pitch constructed in accordance with the invention.

As is seen in Figs. 1 and 2 the device comprises a support or hub 1 mounted loosely on the power transmitting shaft 2 of the engine and in which the blades 3, 3′ of the propeller (having in this case two blades) can turn freely while being retained in place.

On shaft 2 is keyed a carrier or entraining member 4 connected to the arms of levers 5, 5′ of two centrifugal masses 6, 6′, said arms being capable of turning freely on their axes 7, 7′ in said support or hub. The connection between the carrier or entraining member 4 and the arms of levers 5, 5′ is such that when these two members rotate about their axes there results a variation of the direction of application and a variation in length of the engagement of these members. In the drawings the carrier 4 has by way of example two guiding slots 8, 8′ which cooperate with two lugs 9, 9′ carried by the lever arms 5, 5′. The carrier is connected to the blades 3, 3′ in such a manner that its angular displacements with regard to the support are translated into angular displacements of the blades. This is obtained as shown in Figs. 1 and 2 by the arms 10, 10′ of member 4 acting on arms 11, 11′ fixed on the axles of the blades 3, 3′.

The action of the device is as follows:—

When the engine is started up in the direction of the arrow F (Fig. 1) the carrier 4 turns with it but the inertia of the support 1 and of the blades 3, 3′ causes the arms 5, 5′ to follow the movement of the carrier and at first causes the masses 6, 6′ to approach the shaft 2. At the same time the arms 10, 10′ cause the blades to turn on their axles and bring them to an inclination corresponding to that of a propeller with fixed blades, that being the minimum inclination. The aeroplane rising in flight, the thrust of the propeller is thereby reduced and there follows a corresponding reduction of the resistance couple of the propeller. The masses 6, 6′ draw away from the center and the carrier 4 consequently takes up a larger angle with respect to the support 1 which has for its effect to increase the inclination of the blades and consequently to reestablish the value of the thrusts of the propeller.

The distance of the centers of gravity of the masses 6, 6′ with respect to the axis of the shaft 2 and the connections between the carrier 4 and these masses are proportioned in such a manner that for a given speed of rotation of the engine the blades are inclined according to the inclination most advantageous for the resulting running, and such that the resistant couple of the propeller equilibrates exactly the couple of the motor. The variation in length between the axis of the shaft 2 and the lugs 9 on the one hand and the variation in direction of the application of the counteracting forces on the other hand, influence progressively the action of the masses 6, 6′ on the angular variations which are produced between the support 1 and the carrier 4 in order to compensate the variations of the tangential component of the force of the masses 6, 6′ transmitted to the carrier 4.

Figure 3:
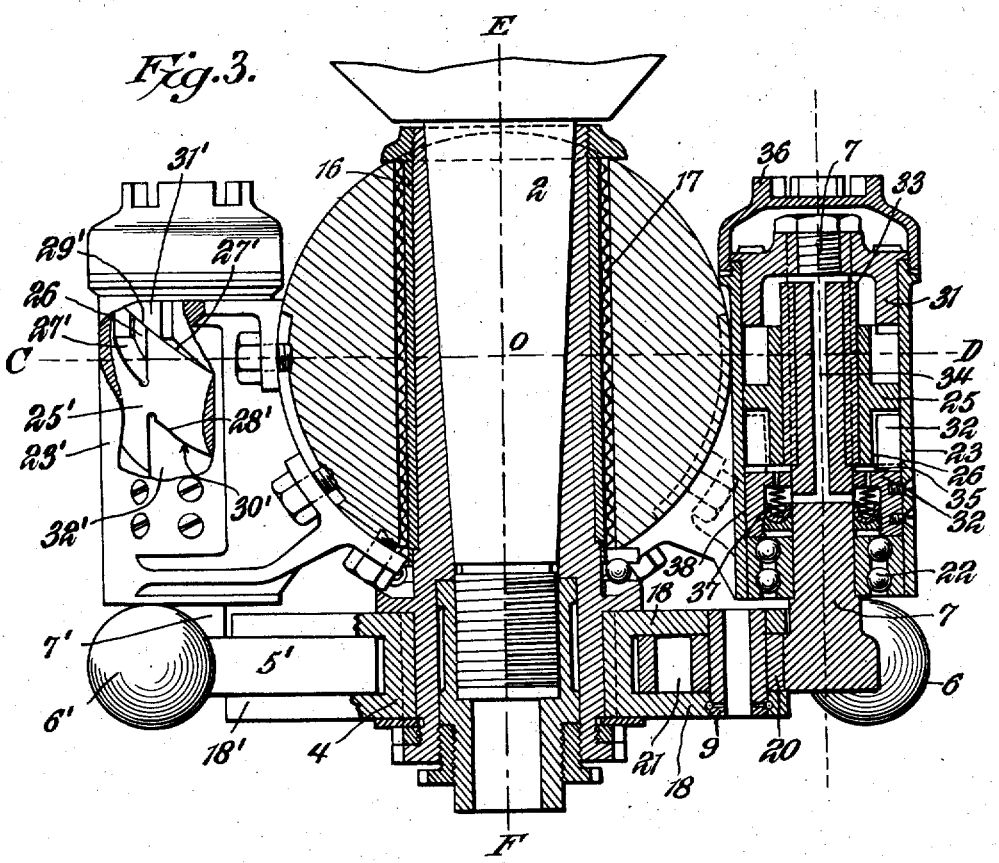
Fig. 3 is a plan view partly in section along line 3—3 of Fig. 2 with parts cut away.
Figure 4:
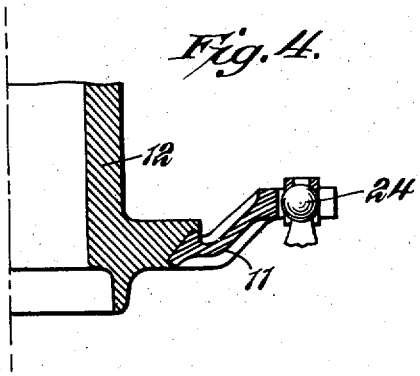
Fig. 4 is a detail view.

In the construction shown in Figs. 2, 3 and 4, the support for the propeller blades 3, 3′ is constituted by a hub 1 in which said blades are rotatably mounted by their axles such as 12, by means of ball bearings such as 13, 14 and a stop or retaining bearing with rollers, such as 15.

This hub 1, as is seen from Figs. 2 and 3, is traversed by the nose of the engine shaft 2 which carries a sleeve 16. Between the sleeve 16 and the hub 1 is interposed a yielding filling 17 formed, for example, by a sleeve of rubber as indicated in Fig. 3. This yielding filling insulates the hub 1 and consequently the blades of the propeller from the vibrations of the engine shaft. It permits in addition an automatic centering of the masses of the propeller, thus avoiding critical points of rotation and assuring a differential equilibration of the thrusts and flexing movements of the blades.

The carrier 4 is fixed on the end of the shaft 2.

This carrier or entraining member is provided with arms 18, 18′ (Fig. 3) which form bearings and support axles, such as 9 on which pivot blocks, such as 20, are mounted to slide in grooves or guides, such as 21, carried by the two arms 5, 5′ pivoted on the axles 7, 7′ of the two centrifugal masses 6, 6′. The axles 7, 7′ are mounted by means of ball bearings such as 22 in boxes 23, 23′ fixed on the hub 1.

This system of entrainment could obviously be replaced by a reversible cam or by radiating variable gears giving the same variation of arm of levers and of direction of application of the forces as the device which has just been described.

Arms 10, 10′ of the carrier (Fig. 2) are connected with the axles 12, 12′ of blades 3, 3′ of the propeller by means of arms 11, 11′ having jointed lugs 24, 24′ (Figs. 2 and 4).

The action of the propeller thus constructed is the same as that of the device illustrated diagrammatically in Fig. 1. The assemblage consisting of the blades 3, 3′, hub 1, boxes 23, 23′, axes 7, 7′, and centrifugal masses 6, 6′, centers itself automatically during rotation on the nose of the engine shaft 2 by reason of the elastic sleeve 17. The application of the engine couple to the propeller is effected by the arms 5 of the centrifugal masses through the intermediary of the axes 9, 9′ and blocks 20. The arm of the lever of the slider of the centrifugal system with respect to the point of application of the motive force on the axes 9, 9′ varies in proportion as the angle, which the carrier 4 makes with respect to the hub 1, increases, this angle being capable of attaining, for example, to the position X—X′ of Fig. 2. This variation in the length of the arm of the lever of the centrifugal system 5, 6, and the variation of the application of the counteracting forces compensate for the variations of the component (of the tangential force of the centrifugal masses) which acts on the carrier in proportion as said masses draw away from the axis AOB, Fig. 2.

In the construction shown in Figs. 2 and 3 the axles 7, 7′ of the centrifugal masses are provided with liquid shock-absorbing devices which neutralizes the rapid movements (return, variation in running) of the mechanism.

Each of these liquid shock absorbers comprises in combination with the cylindrical box 23, a cam 25, 25′ keyed to the axle 7 and capable of sliding with slight friction on the said axle and in the cylinder 23. This cam 25′ (Fig. 3) is provided with helicoidal steps such as 27′, 28′ which, when the axle 7 rotates, screw themselves on the steps 29′, 30′ carried by the fixed portions 31, 31′, 32, 32′. When in Fig. 3 the axles 7, 7′ rotate in the opposite direction to the hands of a watch, the cams 25, 25′ tend to be displaced towards the bottom of the cylinder and conversely. The axle 7 is pierced with channels 33, 34, 35 which cause the two faces of the cam 25 to communicate. When the axle 7 tends to rotate, liquid, for example oil, which fills all the free cavities in the interior of the chambers 26 is forced to pass from the back face to the front face of the cams 25, 25′ and conversely, by traversing the channels 33, 34, 35. These channels being small, the liquid can only move with a reduced velocity which brakes displacements of the cams 25, 25′ and consequently of the axles 7, 7′. The limit of variation of the cams 25, 25′ and consequently of the axles 7, 7′ is attained when the cams 25, 25′ abut at the bottom in front or behind. This limitation of angular position of the axes 7, 7′ determines the maximum angle through which the carrier 4 is capable of being displaced with respect to the hub 1. It is this maximum angle of displacement which is indicated by the line X—X′ of Fig. 2.

In order to avoid any abrupt contact of the cams 25, 25′ at the end of the course, the channels 33 and 35 are obstructed progressively at the end of the course by cams 25, 25′. The free section of the channels 33 and 35 then diminishes at this moment, finally becoming zero.

The fluid tightness of the shock absorber is assured in the rear by a stopper 36 and in front by a leather stamping 37 influenced initially by the springs 38 and so that the liquid in the shock absorber tends to press more against the axles 7, 7′ and against the cams 32, 32′.

In Figs. 5, 6, 7, 8, 9, 10, 11, 12, 13, 14, 15, 16, 17, 18, 19 and 20 is illustrated the type of the stop or abutment employed by preference in combination with the propeller described above, several specific forms thereof being illustrated by way of example.

In the practical construction of the variable speed propeller constituting the present invention the aim has been to reduce to a minimum the causes of vibrations and to dampen as much as possible the effects thereof. But it is manifestly important that those results should not be attained at the sacrifice of the freedom of rotation of the propeller blades in their supports; it being one of the most important problems involved in the construction of variable pitch propellers to insure the free rotation of the blades under all operating conditions, even under the very high strains. In an aeroplane propeller the centrifugal strains are exceedingly high, reaching, in the case of a propeller of three meters diameter driven by an engine of 300–450 H. P. and rotating at 1850 R. P. M., as high as 25–30 tons for a wooden propeller and 45–50 tons for a metallic propeller. It is necessary therefore to provide means capable of sustaining such excessive strains and which at the same time do not introduce a complication of mechanism or an undue increment of weight. Furthermore, the means adopted to conserve the rotatability of the blades must be effective also to deaden the vibrations without rapid deterioration in use.

Figure 5:
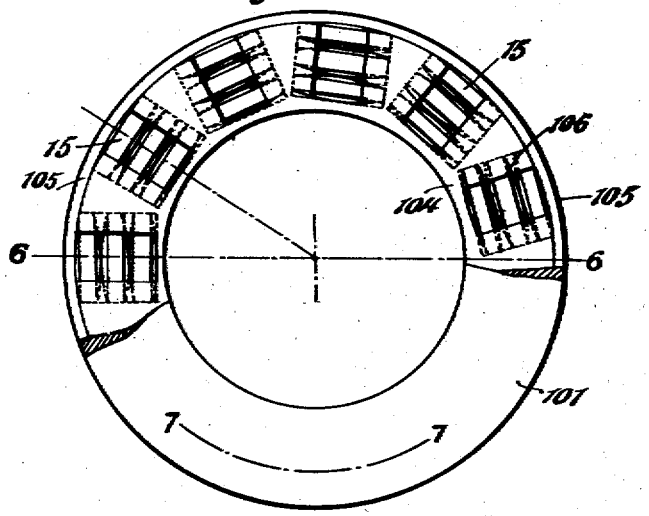
Fig. 5 is a plan view of a stop constructed in accordance with the invention, part of the upper race having been removed.
Figure 6:
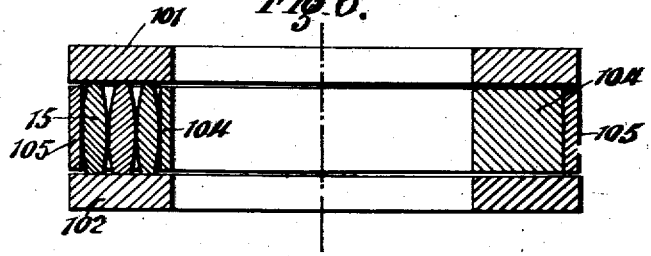
Fig. 6 is a transverse section on line 6—6 of Fig. 5.
Figure 7:
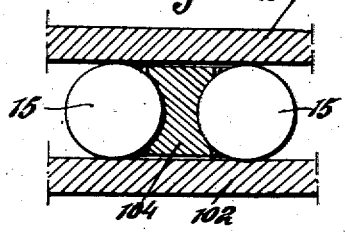
Fig. 7 is a circular developed section on line 7—7 of Fig. 5.
Figure 8:
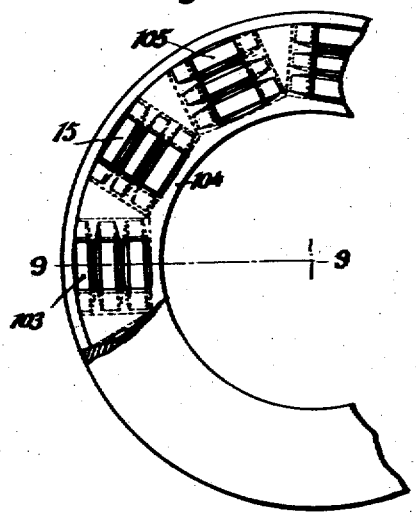
Fig. 8 is a view similar to Fig. 5 of a modification.

These conditions are fulfilled by the high resistance stop or abutment means now about to be described, one form of which is illustrated in Figs. 5, 6 and 7.

The relation of the stop or abutment to the shaft 12 of one of the propeller blades 3 is shown in Fig. 2 at 15. Said stop or abutment comprises bearing races 101 and 102 and cylindrical rollers 15 interposed between the two races. An annular cage 104 has a series of cavities in which the rollers are situated. It is provided with an exterior ring 105 which closes the cavities and encloses the rollers. The cage 104 and its exterior ring 105 having a height less than the diameter of the rollers 15, the rollers project slightly at the upper portion and at the lower portion of the cage through apertures such as 106.

The play between the cage 104 and the races 101 and 102 is calculated in such a manner, given the elastic limit of the metals which comprise these races and the rollers 15, that, in the case of high load, the races come to rest against the cage 104 before the metal of the rollers and of the races has exceeded its elastic limit. A braking effect is thereby produced, but the rotation of the blade is not arrested.

It will be understood that in a device thus constructed and proportioned, the elastic limit of the rollers 15 will never be exceeded and when a load is sustained which, without this device, would have caused permanent deformation of the rollers 15 and of the races 104, the force exerted on the stop will be supported simultaneously by the rollers 15 and by the cage 104, this latter serving to prevent any greater diminution of the diameter of the rollers. Friction will be exerted at the same time in the form of friction of the race against the rollers and also in the form of sliding friction against the cage, the force being supported by these elements.

Figure 11:
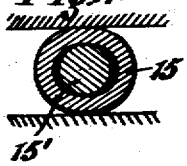
Fig. 11 is a view of the bearing element and of the auxiliary element under high load.

In the form of the invention illustrated in Figs. 8, 9, 10 and 11, the rollers 15 are annular in shape and contain smaller rollers 15′ which fit loosely therein. The difference in diameter between the hollow in the rollers 15 and the rollers 15′ is appreciably less than the play which exists between the races and the cage 104; so that, when the force which is exerted on the stop is sufficient to deform the rollers 15 to the point of reducing to zero the play between the interior of rollers 15 and the auxiliary element 15′ as this is illustrated in Fig. 11, the races will not come in contact with the faces of the cage 104. In this case the rollers 15 become deformed as indicated in Fig. 11 and come to rest on the auxiliary element 15′ which prevents their further deformation. On account of the deformation of the rollers 15, the surface of contact between these rollers and the races 101 and 102 increase and prevents permanent deformation of the latter. The deformation of the rollers 15 will be the more easy the less the difference between their interior and exterior diameters.

By way of modification it will be possible to adjust the intervals between the cage 104 and the races so that if, under the effect of very high loads, the auxiliary element 15′ should tend to be deformed to such an extent that the elastic limit of the metal of which it is made is on the point of being reached, the interval in question becomes zero and that the races, as indicated in the example of Figs. 5, 6 and 7, come to rest on the upper and lower surfaces of the cage so as to oppose any further approaching of the two races and in consequence any final subsequent deformity of the rollers 15 and of the interior cores 15′.

Instead of giving the races a plane form it will be possible to give them the form of annular steps, the rollers having corresponding diameters.

Figure 12:
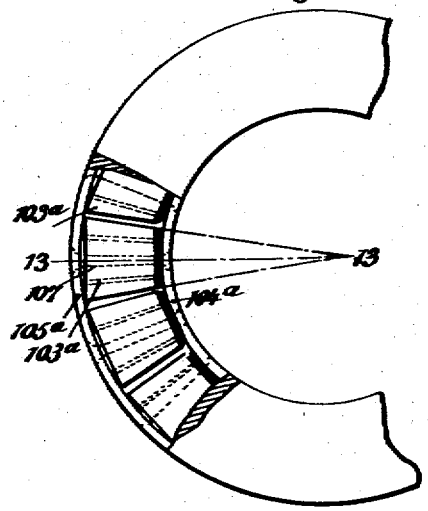
Fig. 12 is a view in plan analogous to Fig. 5 of another variation.
Figure 9:
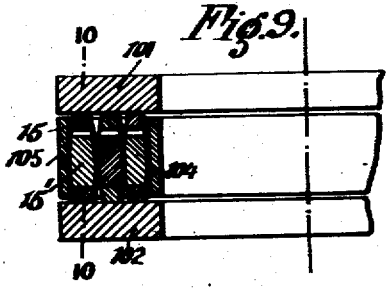
Fig. 9 is a transverse section on line 9—9 of Fig. 8.
Figure 13:
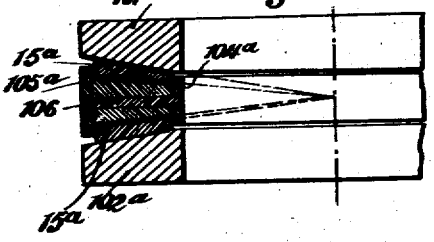
Fig. 13 is a section on line 13—13 of Fig. 12.
Figure 10:
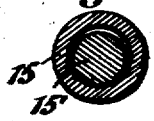
Fig. 10 is a section on line 10—10 of Fig. 9 showing a bearing element with its auxiliary interior reinforcing element.

The example illustrated in Figs. 12 and 13 is in principle the same as that of Figs. 8, 9, 10 and 11, except that instead of cylindrical rollers conical rollers are used. Corresponding members are represented with the same indices followed by the letter *a*.

The conical rollers are placed on axes 106 held at their extremities in the cage 104*a* and in the exterior ring 105*a*.

Figure 14:
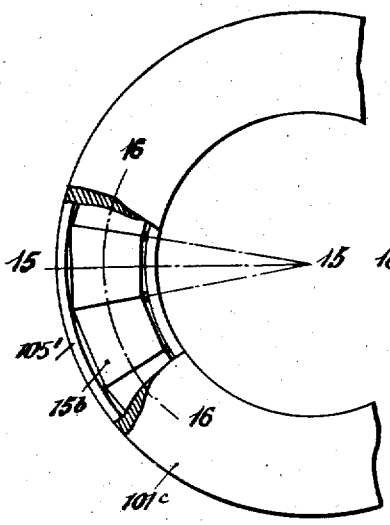
Fig. 14 is a partial front view of another variation with parts broken away.
Figure 17:
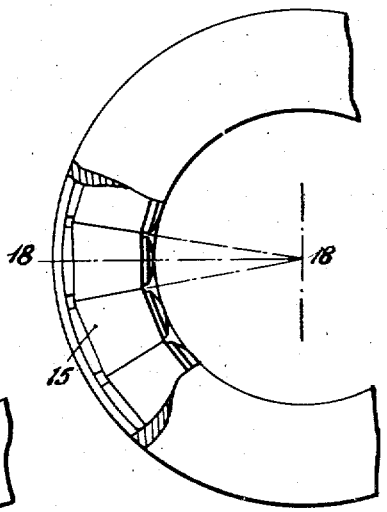
Fig. 17 is a partial view in plan of another variation.
Figure 15:
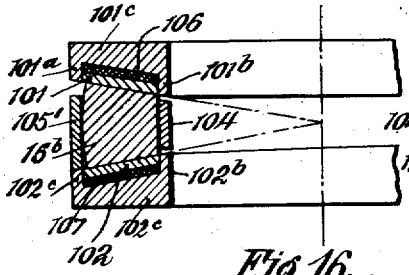
Fig. 15 is a section on line 15—15 of Fig. 14.
Figure 18:
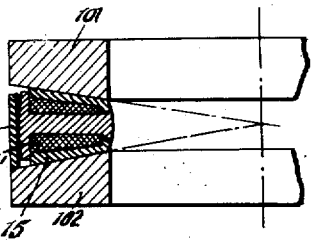
Fig. 18 is a section on line 18—18 of Fig. 17.
Figure 16:
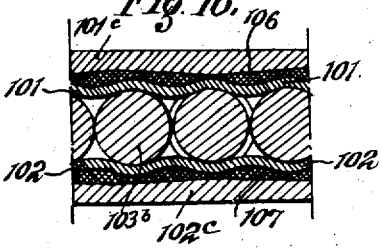
Fig. 16 is a developed circular section on line 16—16 of Fig. 14, the bearing being under high load.
Figure 19:
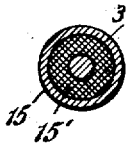
Fig. 19 is a transverse section of the conical roller bearing shown in Fig. 17 under normal load.
Figure 20:
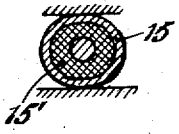
Fig. 20 is a similar section under high load.

In the modification represented in Figs. 14, 15 and 16 the stop, before the elastic limit of the metal is exceeded, is obtained as in the construction in Figs. 5 to 7 by the ring 104 which encircles the conical rollers 15*b*, in contact with which under high load come the edges 101*b*, 102*b* of the boxes 101*c* and 102*c* which contain the races 101, 102. These races are in this instance constituted by thin rings capable of sinusoidal deformation in consequence of the fact that annular sheets 106, 107 of rubber or analogous material are interposed between them and the boxes 101*c*, 102*c*. This deformation gives an increased surface of contact between the rollers and the races and diminishes the fatigue of the metal.

In the modification represented in Figs. 17 to 20 the hollow conical rollers 15 are filled or almost filled with rubber 15′. Under high load the rollers 15 become flattened, but being incompressible they cannot become deformed above a certain limit. This limit can be made very wide as the walls of the rollers can be made very thin, the metal ceasing to resist bending when the rubber has been compressed. The contact surface increases on account of this deformation.

The cage 104 then intervenes in order to limit the approach of the races 101 and 102, and to prevent deformation of the rollers.

What is claimed is:—

1. A variable pitch propeller comprising, in combination with a power shaft, a hub or support rotatably mounted on said shaft, propeller blades orientatably mounted on said hub, an entraining member secured to said shaft through which power is transmitted from the latter to said hub, centrifugal means between said entraining member and said hub, whereby the variable resistant couple of the propeller is maintained at approximately an equal and contrary value to that of the engine couple, and means connecting said entraining member and said blades so as to vary the blade pitch when and as said entraining member is displaced with respect to said hub.

2. A variable pitch propeller comprising, in combination with a power shaft, a hub or support rotatably mounted upon said shaft, propeller blades orientatably mounted on said hub, an entraining member secured to said shaft, means cooperating with said hub and said entraining member to maintain a substantially constant balance between the resisting couple of the propeller and the engine torque and means for connecting said entraining member and said blades so as to vary the blade pitch when a displacement of the entraining members occurs in relation to the said hub.

3. A variable pitch propeller comprising, in combination with a power shaft, a hub or support rotatably mounted upon said shaft, propeller blades orientatably mounted on said hub, an entraining member secured to said shaft, centrifugal masses pivotally mounted on said hub and variably connected to said entraining member whereby the radial displacement of the centrifugal masses controls the angular displacement of the entraining member with relation to the said hub, and means for connecting said entraining member and said orientatable blades so as to vary the blade pitch when said angular displacement occurs—all said means being arranged so as to maintain a substantially constant balance between the resisting couple of the propeller and the engine torque.

4. In a propeller as specified in claim 1, a leverage system interposed between the said entraining member and said centrifugal means for varying the mechanical effect in proportion to the angular displacement between the said support and the said entraining member.

5. In a propeller as specified in claim 3, supports connected to the hub, axes upon which the centrifugal masses are mounted which axes are capable of rotation in the said supports, a connection such as pivoting members and sliders between the axes of the centrifugal masses and the entraining member and a connection between said member and the axes of the propeller blades such that the displacements of the entraining member and therefore those of the centrifugal masses relatively to the hub shall be translated into angular displacements of the blades about their axes.

6. In a propeller as claimed in claim 3, shock absorbers for the axles of the centrifugal masses such as cams having helicoidal steps mounted to slide on the said axles, cylinders, fixed steps and channels for the passage of liquid wherewith the said cams cooperate, the rotation of the axes of the centrifugal masses being adapted to cause longitudinal displacement of the cams and a transfer from one face of said cams to the other of liquid contained in the said cylinders.

7. In a propeller as claimed in claim 3, shock absorbers for the axles of said centrifugal masses such as cams having helicoidal steps mounted to slide on said axles, cylinders, fixed steps, channels for the passage of liquid wherewith said cams cooperate, the rotation of said axles causing longitudinal displacement of said cams and a transfer from one face of said cams to the other of liquid contained in the cylinders, and means whereby the cams are caused to obstruct said channels at the end of their travel.

8. In a propeller as specified in claim 3, an elastic packing disposed between the power shaft and the hub which carries the propeller blades.

9. In a propeller as claimed in claim 1 shock absorbers for the axles of the centrifugal masses such as cams having helicoidal steps and keys sliding on the said axles, cylinders, fixed steps and channels for the passage of liquid wherewith the said cams cooperate, the rotation of the axles of the centrifugal masses being adapted to cause longitudinal displacement of the cams and a transfer from one face of said cams to the other of liquid contained in the said cylinders.

10. In a propeller as claimed in claim 1, shock absorbers for the axles of said centrifugal masses such as cams having helicoidal steps and keys sliding on said axles, cylinders, fixed steps, channels for the passage of liquid wherewith said cams cooperate, the rotation of said axles causing longitudinal displacement of said cams and a transfer from one face of said cams to the other of liquid contained in the cylinders, and means whereby the cams are caused to obstruct said channels at the end of their travel.

ROBERT RICHARD GOBEREAU,
*Pro se and as Assignee of Lucien Edouard Maujole, Deceased.*